United States Patent [19]

Wheeler

[11] Patent Number: 4,594,882

[45] Date of Patent: Jun. 17, 1986

[54] PORTABLE WORK STAND TO QUICKLY RECEIVE, SEAL, AND ROTATE, A CYLINDER HEAD OF AN ENGINE DURING LIQUID LEAK TESTING

[76] Inventor: Thomas E. Wheeler, 18018 74th St. East, Bonney Lake, Wash. 98390

[21] Appl. No.: 571,434

[22] Filed: Jan. 17, 1984

[51] Int. Cl.$^4$ .......................................... G01M 15/00
[52] U.S. Cl. .................................................. 73/49.7
[58] Field of Search ................ 73/40, 40.5 R, 46, 47, 73/49.3, 49.7, 49.8, 52

[56] References Cited

U.S. PATENT DOCUMENTS

| | | | |
|---|---|---|---|
| 2,682,860 | 7/1954 | Ruehl | 73/46 |
| 3,360,984 | 1/1968 | Salsbury et al. | 73/49.7 |
| 3,608,369 | 9/1971 | Wilkinson | 73/49.7 |
| 3,973,429 | 8/1976 | Durgan et al. | 73/49.7 |
| 4,114,425 | 9/1978 | Hicks | 73/40 |
| 4,157,028 | 6/1979 | Moffett, III | 73/49.7 |
| 4,171,636 | 10/1979 | Bergeron | 73/49.7 |
| 4,213,328 | 7/1980 | Roeschlaub et al. | 73/49.7 |
| 4,342,221 | 8/1982 | Silvey | 73/49.7 |

Primary Examiner—Richard V. Fisher
Assistant Examiner—Wanda L. Millard
Attorney, Agent, or Firm—Roy E. Mattern

[57] ABSTRACT

During the overhaul of an internal combustion engine, a two, four, or six cylinder head or manifold is quickly mounted at a convenient working height on a portable work stand with the fire deck surface of the cylinder head entirely bearing against a sole rubber or rubber like continuous gasket to seal off most of the entries to the internal cavities in the cylinder head, through which the engine coolant flows when an engine is running. The gasket is secured to and supported on a table, which in turn is rotatably mounted and lockable on an overall frame, optionally supported on wheels. The cylinder head or manifold is clamped to the work stand in the sealed position by selectively adjusting a securement subassembly, which is quickly utilized, and which does not obscure the inspection of the unsealed surfaces of the head, during a subsequent pressurized hot water test to determine if there are any leaks in the internal coolant cavities of the head.

1 Claim, 4 Drawing Figures

PORTABLE WORK STAND TO QUICKLY RECEIVE, SEAL, AND ROTATE, A CYLINDER HEAD OF AN ENGINE DURING LIQUID LEAK TESTING

BACKGROUND

During the overhaul or rebuilding of a liquid cooled internal combustion engine, or during the manufacture of such engines from the used parts of several engines, a preferred step is to test for leaks in the head or manifold of such engines before their assembly into the rebuilt engine. The equipment offered today from established manufacturers is considered to be of high cost and also to require excessive set up times. A review of U.S.A. patents has not presented such test equipment which could be manufactured for substantially less cost, nor which could be used more conveniently, especially in reference to shorter set up times. However, the review of these patents did disclose the following:

In 1968, Messrs. Salsbury, Fegel, and Larson, in their U.S. Pat. No. 3,360,984, illustrated and described their universal engine cylinder head testing apparatus. A cylinder head was supported on four adjustable height columns with the fire deck surface of the head facing upward. Spaced away on each side of the head were rails. Along the rails individual sealing units were adjustable longtitudinally and transversely to respectively seal each respective opening in the fire deck surface of the head to be tested. During the test the head was held in the same position. Considerable time was involved in placing the head on the four columns, and in placing the seals over the openings in the fire deck surface;

In 1971, Mr. Herbert O. Wilkinson in his U.S. Pat. No. 3,608,369 illustrated and disclosed his engine head test stand, which pivotally supported the engine head after it was clamped in position. During the clamping, selections were made from different clamping units, and selections were made from different engine support plates;

In 1973, Mr. Charles K. Crawford, in his U.S. Pat. No. 3,751,978 disclosed his vehicle motor block tester and method of using the same. Although an engine block rather than an engine head was tested, he did show how a test stand could be pivoted in a limited way. Also he indicated that continuous seals, preformed for certain types of engines, could be placed down on a motor block. Then the seal is covered with a preformed plate, and the seal in turn is covered with a hold down unit having spaced apart cables or clamps;

In 1976, Mr. Virgil R. C. Durgan in his U.S. Pat. No. 3,973,429 illustrated and described his test apparatus for engine heads. At the outset, an engine head with its fire deck below is clamped to a pivotal frame. Thereafter, the pivotal frame is pivoted to place the fire deck above. Then using side rails different selected individual sealing units are placed over respective openings on the fire deck, and thereafter various tests are undertaken inclusive of using hot water under pressure to find any possible leaks in the engine head;

In 1979, Mr. George A. Moffet III in his U.S. Pat. No. 4,157,028 disclosed his portable universal apparatus for use in pressure testing engine cylinder heads and blocks. They were clamped with the fire deck above, between lower spaced transverse bars supported as a group at bench level and overhead transverse bars using bolt and nut fasteners extending between the lower and overhead transverse bars. On each side of the fire deck a continuous strip seal with a respective backing plate was included during the overall clamping to seal the entrances to the coolant passageways. Thereafter these passageways were filled with compressed air, and then the entire apparatus with the head in place was submerged in a hot water vat to check for leaks by possibly observing the formation of escaping air bubbles; and In 1980, Ronald C. Roeschlaub in his U.S. Pat. No. 4,213,328 illustrated and described his apparatus for fluid pressure testing of engine cylinder heads and similar parts. A lockable pivotal frame positioned an engine cylinder head which was clamped into place utilizing longitudinal members on each side, transverse members and vertical hold down bolt and nut fasteners. These fasteners also positioned individual seals for nearby fluid openings, and at other places individual sealing units were especially held in place by special fasteners.

Although collectively the disclosure of these patents describe the pressurized fluid testing of engine cylinder heads and engine blocks to determine if there are any leaks, and in so doing these patents also disclose pivotal mountings of test stand components, so an engine part under test may be rotated during possible leak observations. Moreover, these patents show the use of separate continuous gasket seals to be placed over openings to the coolant cavities and/or passageways in the engine part under test, and in so doing disclose adjustable hold down subassemblies to position the engine parts. Yet, as indicated by the available test stands offered in the marketplace, there remained a need for a lower cost portable engine cylinder head test stand, which could quickly and sealably receive an engine cylinder head for pressurized hot water testing, and be rotatable for the inspection of leaks throughout all the exterior surfaces, except for the surface of the fire deck of the cylinder head.

DRAWINGS

A preferred embodiment of the portable work stand to quickly receive, quickly seal, and readily rotate a cylinder head of an engine during liquid leak testing is illustrated in the drawings, wherein:

FIG. 1 is a perspective view of the portable work stand with an engine cylinder head secured in place, with its fire deck surface resting on a continuous gasket seal, which is permanently secured to a table, that is rotatably and lockably mounted to a vertical column, in turn integrally connected to a horizontal tee frame, equipped with wheels, and the hot water pressure testing is indicated by the intake hose valve and gauge, and the exit valve and hose;

FIG. 2 is a partial top, after the table has been rotated one hundred eighty degrees, showing the intake hose, valve and gauge and exit hose, and also indicating the bottom spaced longitudinal beams secured to the table, and the heads of the spaced elongated bolts, which are shown in FIG. 1 projecting upwardly from the table to adjustably position the top spaced longitudinal clamping beams;

FIG. 3 is an exploded view of the work stand itself to illustrate its assembly; and FIG. 4 is an enlarged partial, sectional, longitudinal, elevational, view to illustrate the flow of hot water under pressure through the intake hose, through the engine cylinder head, and on to the outlet hose at the commencement of the leak testing of coolant passageways, to clear out the air, and before the sequential shutting off of the outlet valve and then the intake valve, to thereafter commence the observation time for any possible leaks.

DESCRIPTION OF PREFERRED EMBODIMENT

Figure 1:
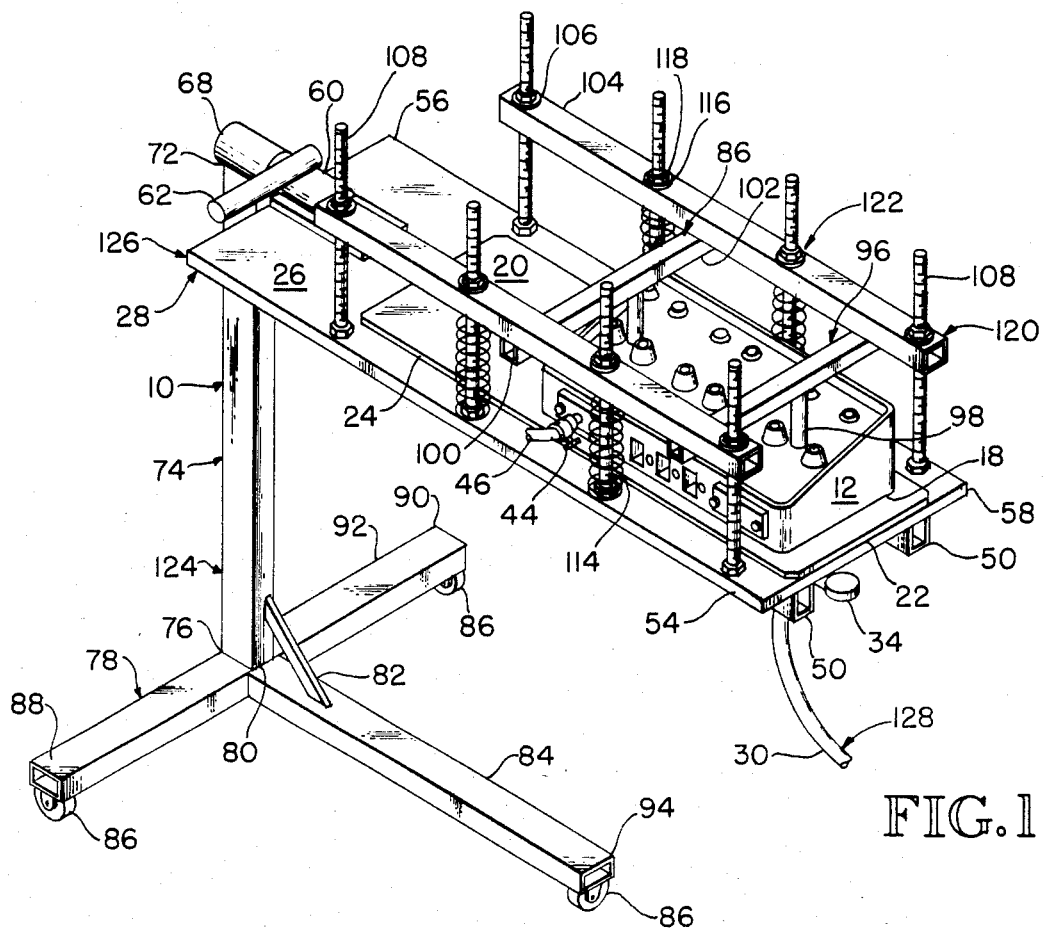
Figure 4:
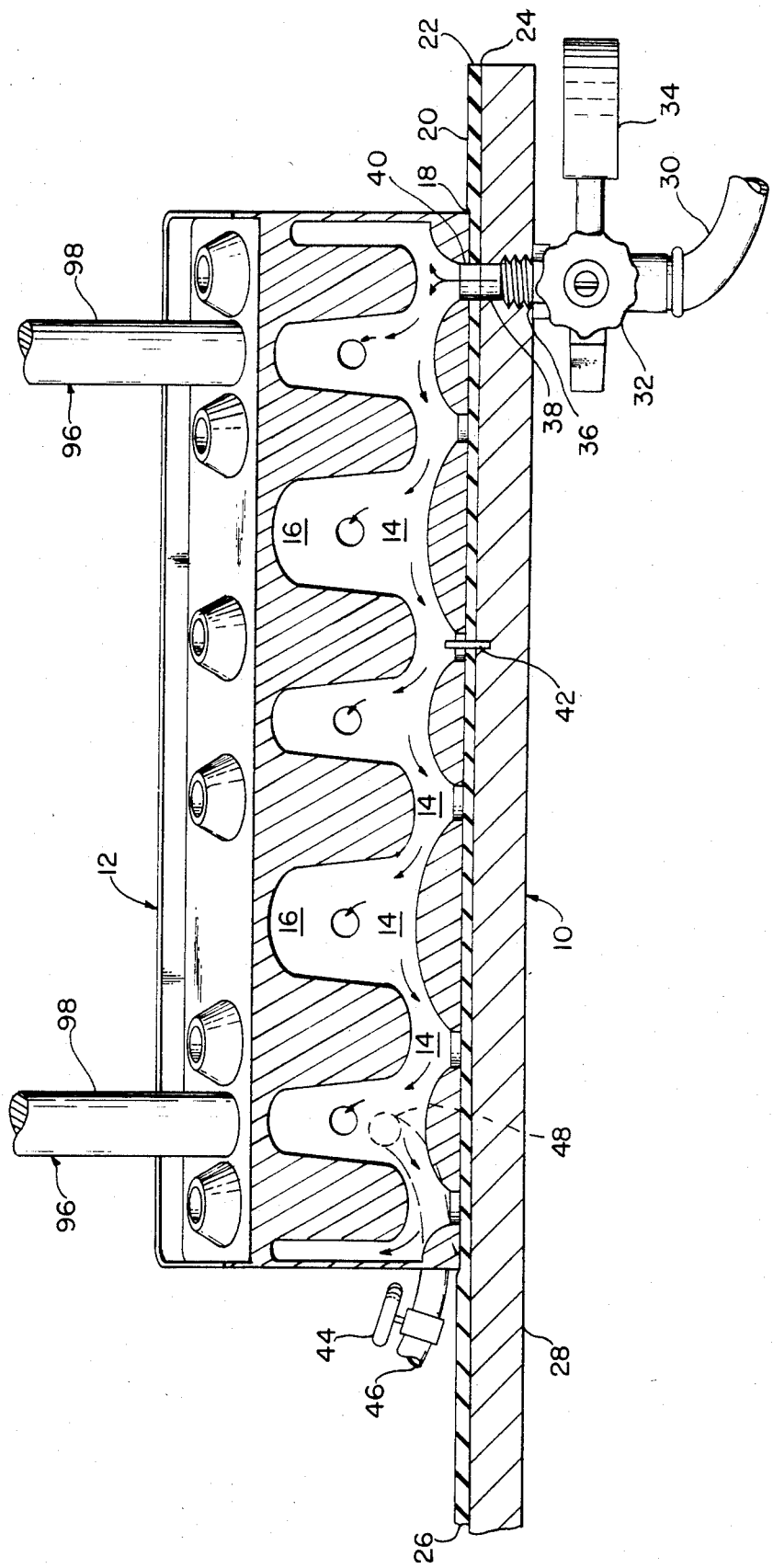

The portable work stand 10 to quickly receive, quickly seal, and readily rotate, a cylinder head 12 or manifold of an internal combustion engine to pressure check, with hot water, the engine coolant passageways 14 and chambers 16 is shown in FIG. 1, after the cylinder head 12 has been secured in place with its fire deck 18 sealably bearing against the top surface 20 of the rubber or rubber-like gasket 22, whose bottom surface 24 is essentially permanently secured to the top surface 26 of the table 28. As futher shown in FIG. 4, with incoming hot water hose 30, valve 32, gauge 34, previously secured in place, via a threaded entry hole 36 in table 28, with a corresponding aligned hole 38 in gasket 22, aligned with the intake 40 of the cylinder head 12, by using a locator pin 42 secured to the table 28 and passing up through the gasket 22, an outlet valve 44, with outlet hose 46, is threadably secured to the outlet 48 of the cylinder head 12 to complete testing installation, during a time period ranging from five minutes for simpler cylinder heads 12 and up to fifteen minutes for complicated cylinder heads.

Figure 2:
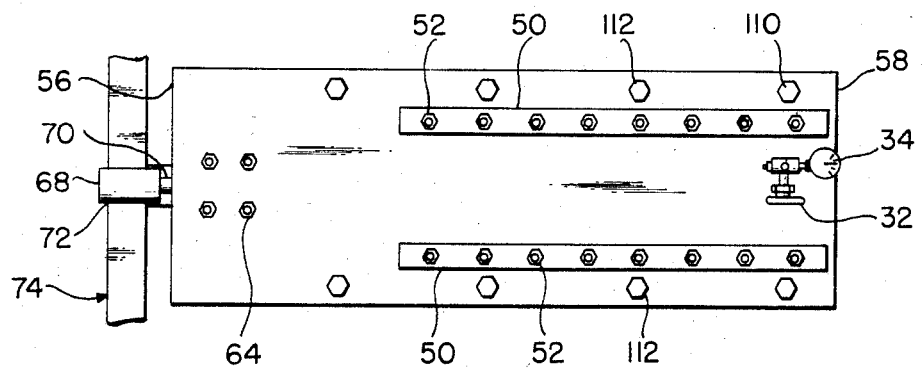

After the completion of this testing installation as shown in FIG. 1, the table 28 with the cylinder head 12 in place is rotated one hundred and eighty degrees to be locked in the position shown in FIG. 2, which is the preferred initial testing position. The pressurized hot water is turned on and remains on until all the air is cleared and the temperature of the hot water remains substantially constant. Then outlet valve 44 is closed and later when the intake pressure gauge 34 indicates the water source pressure, the intake valve 32 is closed. At this time an inspection is commenced to possibly observe leaks and the variation of the pressure gauge 34. All possible leaks to be observed along surfaces of the cylinder head 12 will be readily found, except for the non-observable surface of the fire deck 18.

When the test is completed, the table 28 is rotated one hundred eighty degrees back to the position shown in FIG. 1 and locked, and the cylinder head 12 removal steps are quickly undertaken. Now the cylinder head 12 is clamped into place and removed is indicated in the exploded view of FIG. 3, which also illustrates the overall construction and assembly of this portable work stand 10. The table 28 has two like transversely spaced longitudinal supports 50 secured by fasteners 52 to its bottom surface 54, as shown in FIG. 2. At the table end 56, which is opposite to the table end 58, near where hot water entry hole 36 is located, a cyclindrical bearing 60, equipped with a hand rotatable friction lock 62, is secured by fasteners 64.

The cylindrical bearing 60 receives a cantilevered shaft 66, which extends integrally out from a larger solid cylinder 68. An abutment or thrust bearing surface 70 is thereby formed where the cantilever shaft 66 joins the larger solid cylinder 68. This cylinder 68 is integrally formed with the top 72 of the vertical column 74, which in turn is integrally formed at its bottom 76 with a horizontal tee frame 78 at its juncture 80. A diagonal brace 82 extends between the vertical column 74 and the longitudinal leg 84 of the tee frame 78. Castered wheels 86 are secured to each end 88, 90 of the transverse leg 92 of the tee frame 78, and also to the free end 94 of the longitudinal leg 84, providing mobility to the portable work stand 10.

Figure 3:
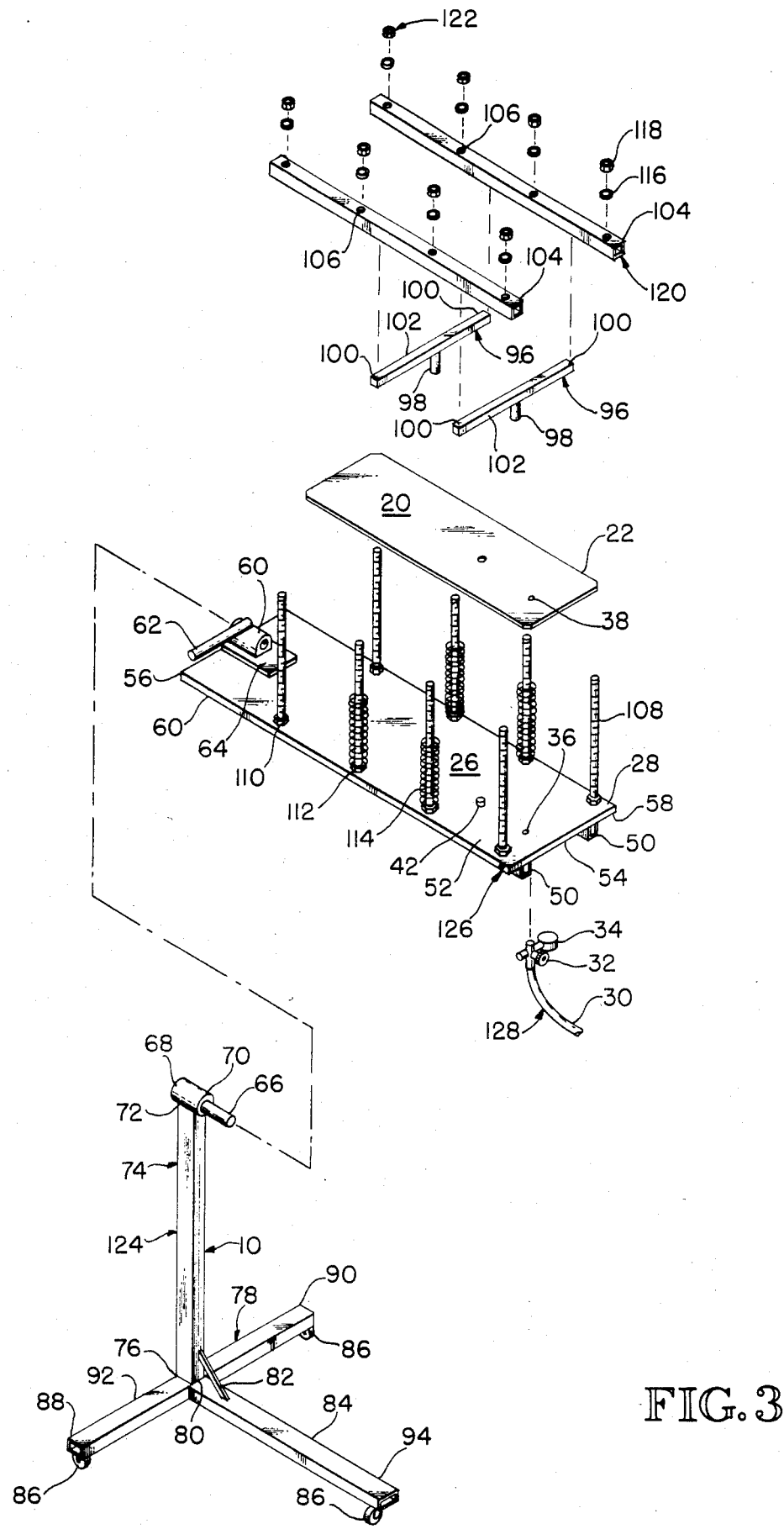

To quickly clamp an engine cylinder head 12 in place, as indicated in FIGS. 1 and 3, it is placed with its fire deck 18 facing down on the top surface 20 of the rubber gasket 22. Then the two transverse tee hold downs 96 are positioned with their centered depending leg 98 bearing directly down on the engine cylinder head 12. The opposite ends 100 of the transverse bars 102 of each transverse tee hold down 96 are positioned under transversely spaced longitudinal rails 104. These rails 104 are adjustably and vertically positioned, using their spaced holes 106, over and down upstanding vertical threaded longitudinally spaced bolts 108. These bolts 108 are secured at respective holes 110 in the table 28, by using fasteners 112. Also these bolts 108 position their respective surrounding compression springs 114.

To complete the securement of the engine cylinder head 12 to the rubber gasket 22, consequently to the table 28, and ultimately to the portable work stand 10, washers 116 and nuts 118 are placed over and then around the vertically threaded longitudinally spaced bolts 108, and then the nuts 118 are firmly tightened against the longitudinal rails 104, which bear against the transverse tee hold downs 96, which in turn bear against the engine cylinder head 12 to secure it in place. Thereafter, the outlet valve 44 and outlet water hose 46 are installed, and any other possible openings are sealed. Then the hot water is turned on and the test procedures are underway to determine any coolant system leaks in respect to the engine cylinder head 12.

The clamp down assembly 120 is the group of vertical bolts 108, the springs 114, the longitudinal rails 104, the transverse bars 102 and the fasteners 122 consisting of the washers 116 and nuts 118. The frame assembly 124 is the group of castered wheels 86, longitudinal leg 84, diagonal brace 82, transverse leg 92, tee frame 78, vertical column 74, larger solid cylinder 68, and cantilever shaft 66. The table assembly 126 is the group of the table 28, longitudinal supports 50, fasteners 52, rubber gasket 22, cylindrical bearing 60, hand rotatable lock 62. The hot water testing assembly is the group of incoming hot water hose 30, valve 32, gauge 34, optionally, a pressurized hot water source, not shown, outlet valve 44 and outlet water hose 46.

In consideration of the manufacture of this portable work stand 10 for lower cost shipment before its arrival at a place of use, changes are made. For example, the frame assembly 124 would be made in knock down form for subsequent fastening together. The longitudinal leg 84, diagonal brace 82, transverse leg 92, and vertical column 74, would be shipped as separate pieces, aligned, and packaged in a small volume, and then at a place of use, assembled via fastening means. These parts plus the others are all closely packed for shipment and later these parts are all conveniently and quickly assembled for their efficient utilization in testing of cylinder heads of engines for possible leaks in the cooling system.

In the illustrated embodiment and in the described knock down embodiment, after the initial assembly at a repair or overhaul shop, the washers 116 and nuts 28, i.e. the fasteners 122, are generally not removed. Instead they are loosened only enough, following a test, so the springs 114 will raise the longitudinal rails 104 just above the opposite ends 100 of the transverse bars 102. Then these transverse bars 102 are rotated clear of these longitudinal rails 104, and thereafter the transverse bars 102 are lifted clear of the engine cylinder head 12, completely freeing it. Also the inlet components of the hot water testing assembly 128, remain in place, during successive tests, and this procedure reduces the set up times and removal times during the testing of engine manifolds and engine cylinder heads. By using just the one large overall rubber gasket 22 which is essentially permanently secured to the table 28, the time of sealing is very substantially reduced. As a consequence, this portable work stand 10 is comparatively more quickly utilized than any other known work stands for the purpose of checking for coolant system leaks of a head or manifold of an internal combustion engine.

I claim:

1. A portable work stand to quickly receive, hold, seal, rotate, and supply with test water, a cylinder head of an engine during liquid leak testing of the engine coolant passageways in the cylinder head, while the fire deck of an engine cylinder head is sealably bearing against an overall continuous gasket, comprising:
   (a) a frame assembly having:
      (1) a horizontal frame of a tee configuration having an intersecting cross head portion and a leg portion;
      (2) three caster wheels on the horizontal frame;
      (3) a vertical column upstanding on the horizontal frame at the tee intersection of the cross head portion and the leg portion; and
      (4) a horizontal bearing shaft at the top of the vertical column adapted for securement to a horizontal table; and
   (b) a horizontal table having:
      (1) an overall continuous gasket, to underlie a fire deck of an engine cylinder head, secured to the top surface of the table, having one orifice to accommodate the entry of hot testing water;
      (2) a cylindrical bearing secured to one end of the table for rotatable placement over the horizontal bearing shaft at the top of the vertical column;
      (3) a friction lock on the cylindrical bearing to hold this bearing at a given position about the horizontal bearing shaft;
      (4) a threaded orifice in the table to receive a valve of a hot water system; and
      (5) eight holes in the table adapted to receive eight vertical hold down bolts of a clamp down assembly; and
   (c) a clamp down assembly having:
      (1) eight spaced vertical hold down bolts, with four of them secured to one respective side of the horizontal table, and four of them secured to the other respective side;
      (2) eight copression springs placed down and over the eight vertical hold down bolts;
      (3) two spaced apart horizontal and longitudinal rails having eight spaced through receiving holes placed over and down the eight spaced vertical hold down bolts to rest against the compression springs;
      (4) eight fasteners to secure the two spaced apart horizontal and longitudinal rails to the eight spaced vertical hold down bolts at selective heights above the horizontal table; and
      (5) two transverse tee hold downs, each having a transverse horizontal cross head and each having a depending vertical leg, depending from the transverse horizontal cross head, adapted to bear down on a cylinder head of an engine, in turn positioned on the gasket of the table, and each transverse horizontal cross head is arranged so the ends thereof extend underneath the two spaced apart horizontal and longitudinal rails, so when the eight fasteners are tightened, each transverse tee hold down bears down on a cylinder head of an engine; and
   (d) hot water testing assembly having:
      (1) an intake hose to be connected to a hot water source under pressure;
      (2) a valve connected to the intake hose;
      (3) a pressure gauge interconnected between the valve and the table;
      (4) an outlet valve to be connected to a coolant water discharge orifice on a cylinder head of an engine being tested for possible leaks in the coolant passageways, and
      (5) a discharge hose connected to the outlet valve for directing discharged test water toward a drain.

* * * * *